(12) United States Patent
Wong

(10) Patent No.: US 9,518,507 B2
(45) Date of Patent: *Dec. 13, 2016

(54) TURBO RECHARGER

(71) Applicant: Alexander Wong, Kaneohe, HI (US)

(72) Inventor: Alexander Wong, Kaneohe, HI (US)

(*) Notice: Subject to any disclaimer, the term of this patent is extended or adjusted under 35 U.S.C. 154(b) by 0 days.

This patent is subject to a terminal disclaimer.

(21) Appl. No.: 14/951,373

(22) Filed: Nov. 24, 2015

(65) Prior Publication Data
US 2016/0084151 A1 Mar. 24, 2016

Related U.S. Application Data

(63) Continuation of application No. 14/181,548, filed on Feb. 14, 2014, now Pat. No. 9,200,556.

(60) Provisional application No. 61/765,459, filed on Feb. 15, 2013.

(51) Int. Cl.
| F02B 63/04 | (2006.01) |
| F02C 7/36 | (2006.01) |
| H02K 7/18 | (2006.01) |
| F02B 37/00 | (2006.01) |
| F01N 5/04 | (2006.01) |
| F02B 39/10 | (2006.01) |
| B60K 6/26 | (2007.10) |
| F02B 33/40 | (2006.01) |
| F02B 37/18 | (2006.01) |

(52) U.S. Cl.
CPC .......... F02B 37/005 (2013.01); B60K 6/26 (2013.01); F01N 5/04 (2013.01); F02B 33/40 (2013.01); F02B 37/186 (2013.01); F02B 39/10 (2013.01); F02B 63/04 (2013.01); B60Y 2200/92 (2013.01); Y02T 10/144 (2013.01); Y02T 10/16 (2013.01); Y10S 903/906 (2013.01)

(58) Field of Classification Search
CPC .......... F01M 5/04; F02B 37/005; F02B 39/10; Y02T 10/144; Y02T 10/16; Y02S 903/906
USPC ....... 60/602, 605.1, 608; 180/65.28, 65.285; 903/906
See application file for complete search history.

(56) References Cited

U.S. PATENT DOCUMENTS

| 2,649,083 A * | 8/1953 | Vogel | F02B 27/00 123/184.53 |
| 5,906,098 A * | 5/1999 | Woollenweber | F02B 37/005 60/608 |
| 2008/0276913 A1* | 11/2008 | Zubeck | B60K 6/442 123/543 |
| 2011/0072815 A1* | 3/2011 | Pesiridis | F01D 17/141 60/615 |

(Continued)

Primary Examiner — Audrey K Bradley
Assistant Examiner — Dapinder Singh
(74) Attorney, Agent, or Firm — Buchalter Nemer

(57) ABSTRACT

Embodiments as described herein provide a simplified turbo recharger for an efficient, reliable, low-cost system that delivers good performance for improving efficiency of a vehicle using electric power. Embodiments as described herein may be used with electric motor, combustion engine hybrid vehicles to improve the fuel efficiencies of such vehicles. A turbine may be positioned in an exhaust stream of a vehicle that is coupled to a generator to recharge the battery of a vehicle. The turbine may include a wastegate to permit the exhaust stream to enter or bypass the turbine depending on the charge of the battery, the rate of rotation of the turbine, pressure within the turbine, the speed of the engine, or a combination of the above.

19 Claims, 6 Drawing Sheets

(56) References Cited

U.S. PATENT DOCUMENTS

2014/0041380 A1* 2/2014 Byrd ................... F02B 37/16
                                                                60/602

* cited by examiner

TURBO RECHARGER

CROSS-REFERENCE TO RELATED APPLICATIONS

This application is a continuation of U.S. application Ser. No. 14/181,548, filed Feb. 14, 2014, now U.S. Pat. No. 9,200,556, which claims the benefit of priority to U.S. Provisional Application No. 61/765,459, filed Feb. 15, 2013, all of which are incorporated in their entirety by reference into this application.

TECHNICAL FIELD

This application relates to using exhaust gases from an engine to charge an electric motor. Embodiments as described herein are used to increase the efficiency of hybrid vehicles.

BACKGROUND

Hybrid electric vehicles currently employ electric motors in conjunction with an internal combustion engine (usually gasoline or diesel) to improve gas mileage by permitting the engine to operate more efficiently. Typically, the motor is used either during the entire operation of the vehicle, alone, or in conjunction with the combustion engine during times that would be most inefficient for the engine, such as upon starting the vehicle and during much of the acceleration. The combustion engine is used either to power the vehicle or recharge the battery of the motor when the motor is not in use. Therefore, the engine is generally used in optimum or more efficiently favorable conditions, thus optimizing engine performance and saving fuel.

Some vehicles use a turbocharger to use waste heat from the vehicle exhaust to provide extra power to the vehicle. In some cases, a turbine is positioned in the exhaust path to turn the waste heat into mechanical energy. The turbine is then generally coupled to a compressor that is used to compress the air into the engine. The compressed air permits additional fuel to be injected into the engine and combusted to provide additional power for the same component space.

The cost of a hybrid vehicle is generally greater than that of a comparative internal combustion engine vehicle. The cost is at least partially deferred by the savings in gasoline. However, the gas efficiency of a hybrid vehicle may not be sufficiently high to encourage customers to choose a hybrid without other incentives. In certain cases, some mid-sized hybrid vehicles may get equal or less gas mileage compared to select compact internal combustion engine cars.

SUMMARY

According to embodiments, a turbo recharger is described in which a turbine blades are turned by exhaust gases from a vehicle, which is connected to an electric generator via a shaft. This electric generator converts the mechanical energy to electrical energy, and supplies power to recharge the vehicle's battery. In one embodiment, the battery powers an electric motor of an electric hybrid vehicle. Other features, such as an electronic, computer-controlled wastegate may be used in conjunction with the turbine to control the turbine spin rate, prevent overcharging of the battery, or provide unrestricted flow to the exhaust to improve performance of the engine. In an exemplary embodiment, the turbine is designed to spin at a desired rate complimentary to the coupled electric generator, thus eliminating or reducing the need for gear reductions, cooling, precision manufacturing, etc.

DETAILED DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Embodiments as described herein provide a simplified turbo recharger for an efficient, reliable, low-cost system that delivers good performance for improving efficiency of a vehicle using electric power. Embodiments as described herein may be used with electric motor, combustion engine hybrid vehicles to improve the fuel efficiencies of such vehicles.

In an exemplary embodiment, a turbine is positioned in the exhaust stream of a vehicle exhaust. A shaft couples the turbine to an electric generator, which is used to charge a battery used to power the electric motor. In an exemplary embodiment, a single, fixed shaft is used to couple the turbine to the generator. The turbine may be configured to operate at a desired optimum revolution, such that no gearing is required between the turbine and the generator.

Figure 1:
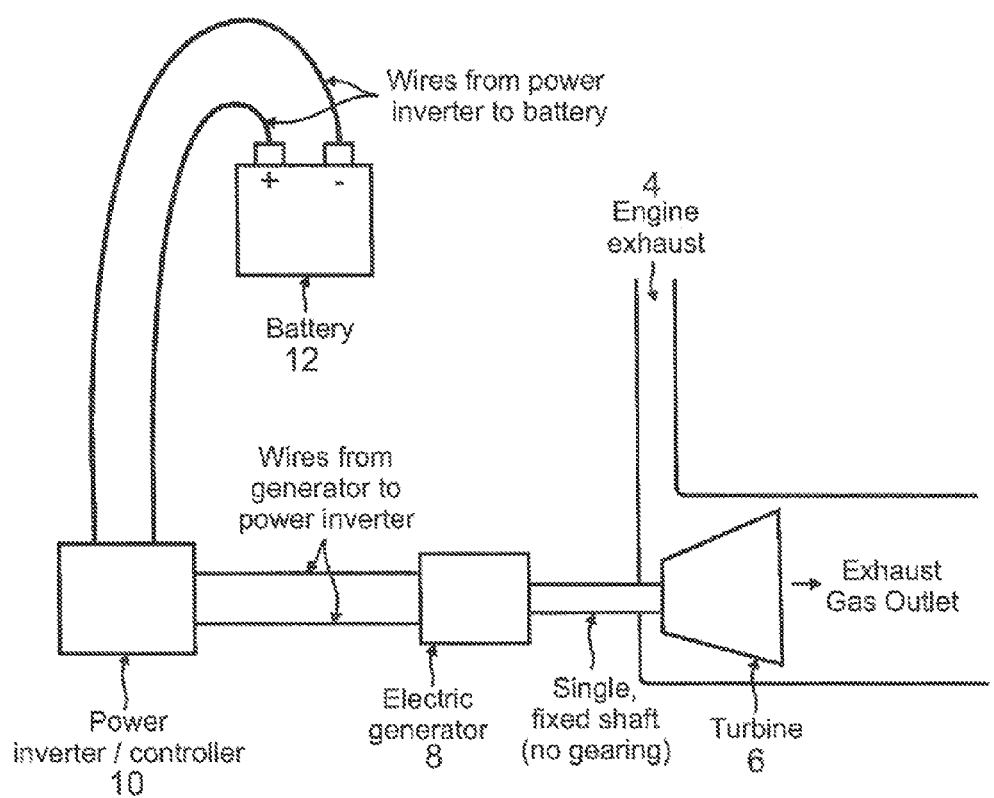
FIG. 1 illustrates a block diagram of an exemplary embodiment of the present invention including an exhaust stream, fixed shaft turbine to electric generator, electric generator, power inverter/controller, and battery.

FIG. 1 illustrates an exemplary embodiment of a block diagram for a turbo recharger 2 for use in an electric hybrid vehicle. The electric hybrid vehicle includes a conventional exhaust 4 from the combustion engine. A turbine 6 is positioned in the combustion engine exhaust 4 path. The turbine 6 is coupled to the electric generator 8, which is coupled through a power inverter 10 to the battery 12. Alternatively or in parallel, the electric generator 8 may be directly or indirectly coupled to the electric motor of the hybrid electric vehicle. For example, the power inverter may be a power controller that directly couples to both the battery 12 and the electric vehicle, such that the turbo recharger can directly power the electric motor or indirectly power the electric motor by directly charging the battery 12. The battery 12 may also be used to power on-board car system instead of or in addition to the electric motor. Wires may be used to couple the electric generator 8 to the power inverter 10 and then to the battery 12. Shafts, gears, and/or linkages may be used to couple the turbine 6 to the electric generator 8.

As a car's internal combustion engine increases in speed (rpm), it spools up a turbine 6. Instead of being connected to a centrifugal compressor or a blower, as in a turbocharger, the turbine 6 is connected to an electric generator 8. The electric generator sends an electric current to a power controller/inverter 10. The power controller/inverter then converts the current from alternating current (AC) to direct current (DC) and to a voltage usable by the batteries 12. Thus, the turbine 6 is used to recharge the hybrid vehicle's batteries and captures much of the energy that would be lost in the engine exhaust in the form of waste heat and pressure. The electricity generated by the generator can then either directly power the electric motors or recharge the batteries which may then be used to turn electric motors that would normally help propel the hybrid vehicle.

According to an exemplary embodiment, the turbine may operate at a slower speed than is customary on presently used turbochargers, i.e. 100,000 plus revolutions per minute (rpm). Such a turbine may, for example, operate at a maximum speed of 25,000 rpm and preferably between approximately 5,000 and 15,000 rpm. The reduced speed may reduce manufacturing costs associated with the turbine by eliminating the need for fluid bearings or precision ball bearings. In an alternate embodiment, the electric generator may be modified to operate at higher speeds of a typical turbine. The electric generator and turbine may include a cooling system, such as a liquid cooler to reduce the heat generated from the additional energy. Fluid bearings and precision ball bearings may also be used to prevent overheating and improve reliability.

Through one or more linkages, including shafts and gears, the turbine 6 may be coupled to an electric generator 8. FIG. 1 illustrates an exemplary embodiment in which the turbine is directly coupled to the electric generator. As shown, a single, fixed shaft transfers the power from the turbine 6 to the electric generator 8. One or more linkages, gears, or shafts may also be used between the turbine 6 and the electric generator 8. However, in FIG. 1, the connection is a direct one via a fixed shaft such that the turbine spins at the same rate or approximately the same rate as the generator. Therefore, either or both of the turbine and/or electric generator may be fashioned to impose spin rates that correspond to that of the other.

Figure 2:
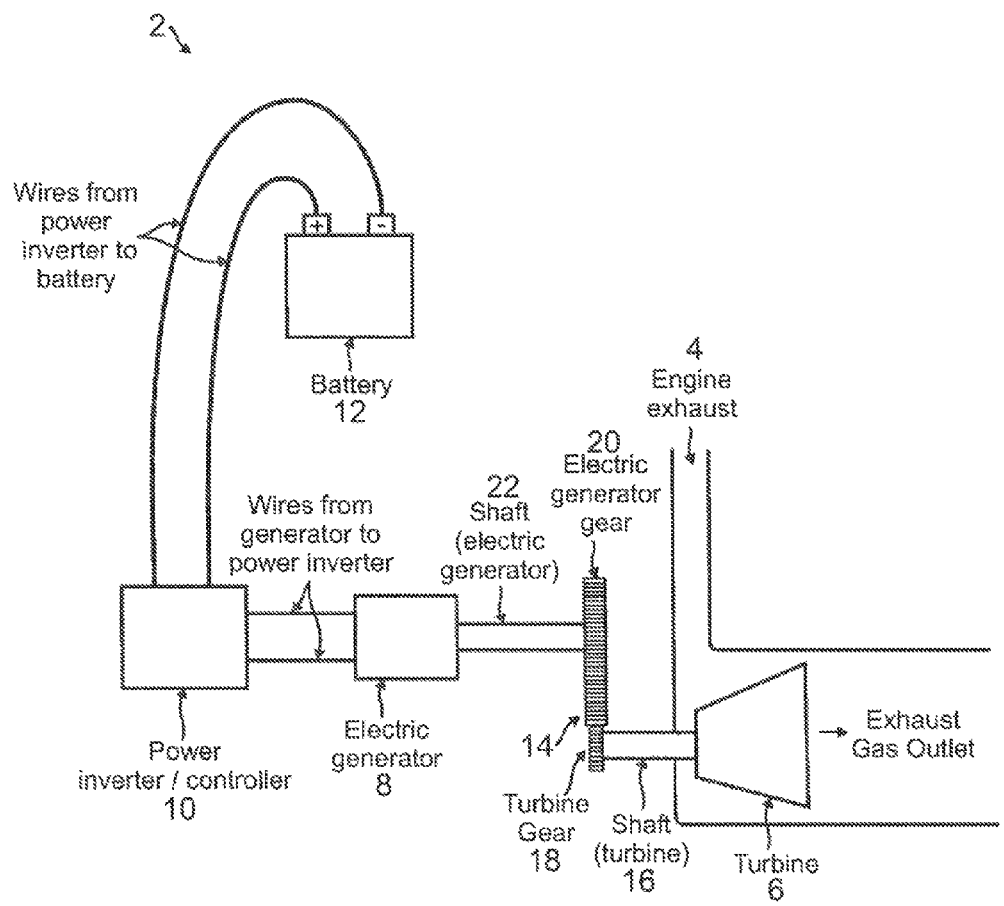
FIG. 2 illustrates a block diagram of an exemplary embodiment of the present invention including an exhaust stream, reduction gear set, turbine, electric generator, power inverter/controller and battery.

As illustrated in FIG. 2, according to an exemplary embodiment, a reduction gear set 14 may be used with turbines of the present invention or with existing turbines. Using reduction gears permits the use of an existing turbine design that spins at 50,000 rpm or more. For example, a turbine that spins at 100,000 rpm may be used with a reduction gear set to allow the electric generator to spin at only 50,000 rpm, 20,000 rpm, 10,000 rpm or slower, instead of being forced to match the revolutions of the turbine to that of the electric generator. As illustrated, the turbine 6 includes a turbine shaft 16 and turbine gear 18. The electric generator 8 includes a generator shaft 22 and an electric generator gear 20. The generator gear 20 and the turbine gear 18 mate, such that the turbine gear 18 spins the generator gear 20. The generator gear 20 is larger than the turbine gear 18 so that the generator need not spin as fast as the generator.

Figure 3:
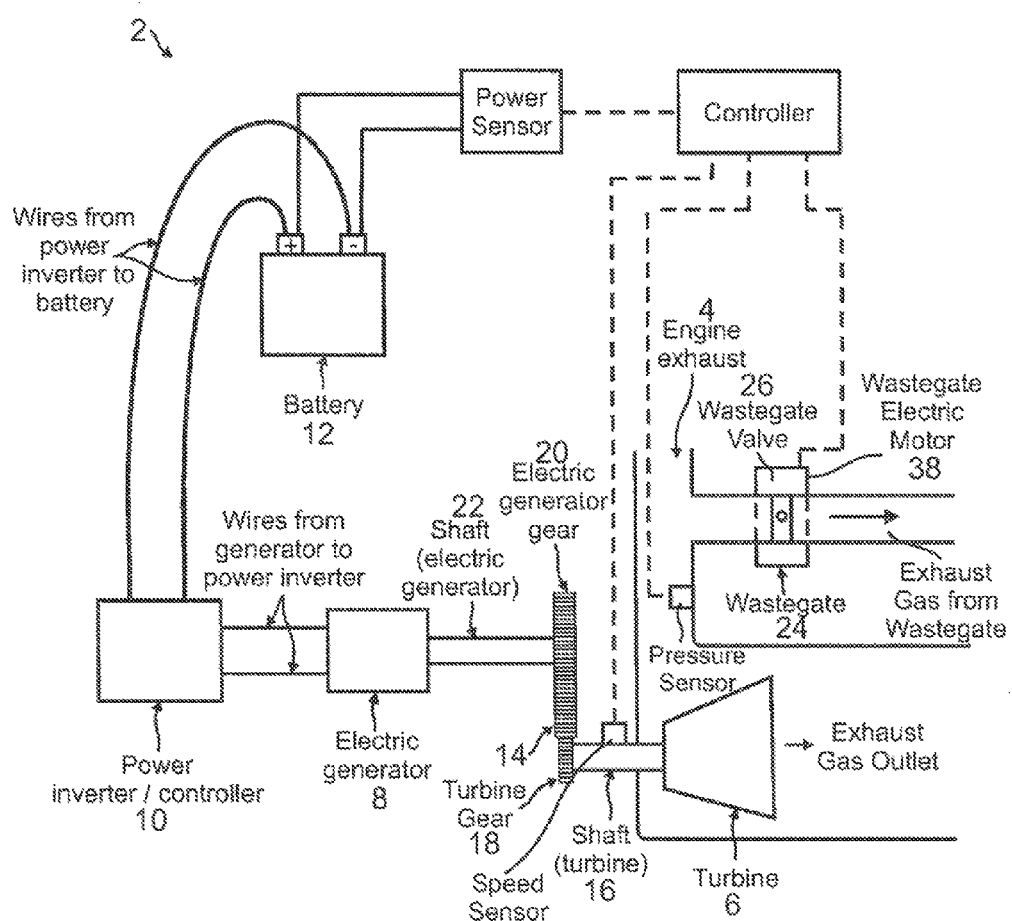
FIG. 3 illustrates an exemplary embodiment having a wastegate to control the exhaust through the turbine.

As illustrated in FIG. 3, in an exemplary embodiment, a wastegate 24 may be used to direct the engine exhaust 4 and control the exhaust through the turbine 6. The wastegate 24 may be a computer-controlled electronically actuated wastegate incorporated into the system. A wastegate opens to release pressure once a set threshold is reached. A wastegate can divert the exhaust stream away from the turbine to prevent it from spinning too rapidly. Thus, at high pressure the wastegate may be used to open a flow path from the vehicle exhaust and reduce the revolutions of the turbine. However, at low to medium pressure, the wastegate typically remains closed, thus requiring low to medium pressure exhaust to enter the turbine.

However, the interrupted flow path at low pressure and rpm, as when the engine is revving from a stop or from idle, reduces the engine efficiency. Accordingly, embodiments of the present invention may include a computer-actuated wastegate that may determine the optimal operating pressures to permit unobstructed flow from the combustion engine exhaust. For example, software and/or hardware may be used to detect the pressure in the exhaust and use this data along with engine speed to determine when the wastegate should be opened. According to one embodiment, the wastegate 24 may be opened from engine idle to approximately 1,500 to 2,500 rpm while the car is accelerating to permit the free flow of exhaust at low pressure. The wastegate may then be closed (or partially closed) to permit the waste gas to impart waste energy to the turbine. The wastegate may then be opened again depending on the operational conditions of the battery, such as when a certain charge threshold is obtained or depending on the speed and/or pressure achieved by or within the turbine. The high pressure where the wastegate can be open is estimated to be around 12 psi or higher. The low pressure where the wastegate may remain open is initially estimated to be around 0 to 3 psi. These initial estimates are only guidelines that will be determined by a wide range of factors, including engine speed, charge state of the battery, and whether the vehicle is accelerating. Ideally, the wastegate will remain closed while the car is cruising at freeway speeds, assuming the battery is not already fully charged.

For example, a current generation ($2^{nd}$ gen) Ford Fusion Hybrid is capable of cruising on the highway under electric only power at 62 mph for short distances. Assume that the Ford Fusion Hybrid will be driving at a constant 55 mph. It cannot sustain this speed for more than a few miles given its very limited battery pack. However, with the turbo recharger attached to the powertrain, according to embodiments as described herein, the wastegate would remain closed a highway cruising speeds, which will force the exhaust stream into the main conduit to spool up the turbine which will then turn the electric generator (possibly using a reduction gear set) and send an electric current to the power inverter which will then directly power the electric motors or charge up the battery. Given that the battery is constantly being recharged by what would have been otherwise wasted heat energy that has now been turned into mechanical energy, and finally into electrical energy, the battery can maintain a high level of charge. The battery can now power the car's electric motors or they can be powered directly from the power controller to help propel the car along at 55 mph. In the conventional system, the gasoline engine would have been doing all the work without the turbo recharger. The turbo recharger may continue working at all times until the pressure reaches a certain very high threshold that could cause damage to the turbine, the electric generator, the reduction gear set, or overcharge the battery. At that time, the wastegate may then open to allow the exhaust gases to enter into the bypass conduit and be diverted away from the turbine. The wastegate may normally remain closed even as the car is decelerating to a stop as it continues to capture at least some exhaust gases to continue to spin the turbine (albeit at a lower RPM). As the car starts to accelerate again, the wastegate will open to allow the gasoline engine to breathe freely as it accelerates. Thus, the position of the wastegate (open, closed, or partially open) is determined by a unique algorithm utilizing factors such as turbine (and electric generator) RPM speed, gasoline engine speed, pressure of the exhaust stream, charge state of the battery, and whether or not the car is accelerating.

As seen in FIG. 3, in an exemplary embodiment, a wastegate 24 may be used to vent additional pressure from the vehicle exhaust and bypass the turbo recharger 2. The wastegate 24 may be coupled to one or more sensors that detect exhaust pressure, engine speed, and battery charge. The wastegate may be opened to relieve pressure in the turbine so that the speed of the turbine may be controlled. The wastegate may be opened once the battery is sufficiently charged such that the battery is not overcharged. The wastegate may also be opened during low pressure, such as when the engine is revving up, so that the exhaust flow is minimally interrupted. Thus, the wastegate 24 may be used to improve efficiency of the engine and/or motor depending on the operating conditions of the vehicle, engine speed, turbine, motor, and battery.

Figure 4:
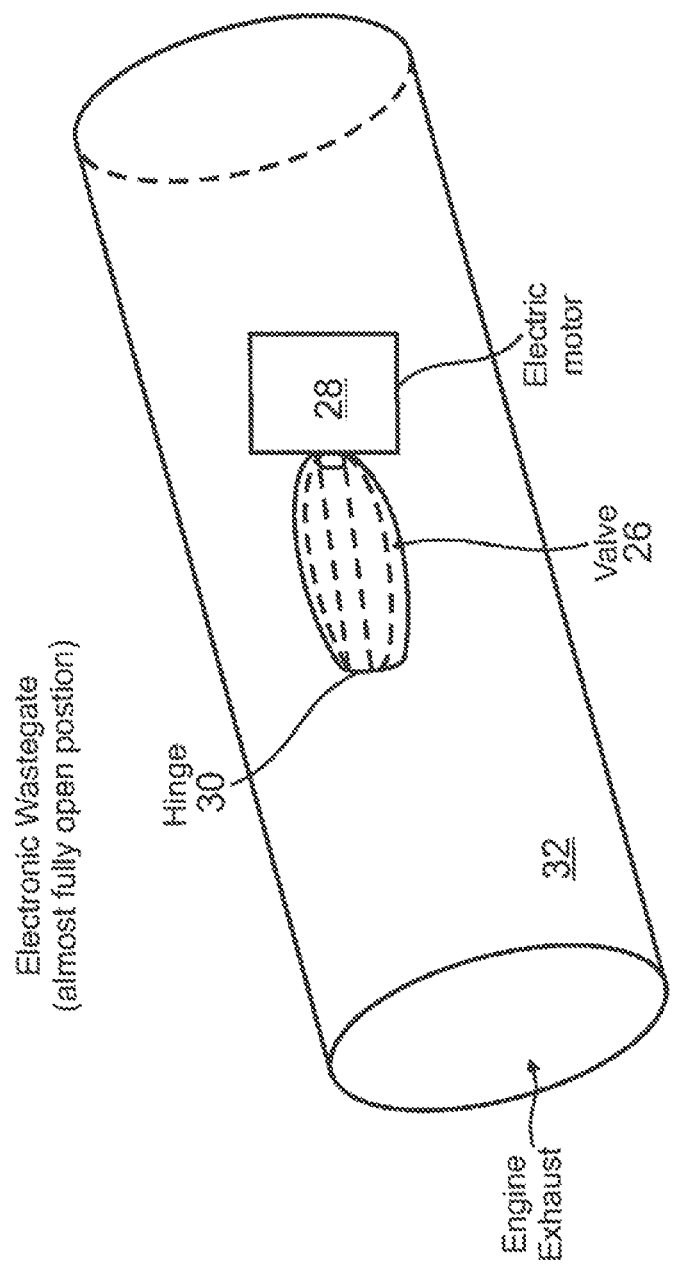
FIG. 4 illustrates an exemplary embodiment having a generally planar gate valve positioned inside the exhaust housing.

As seen in FIG. 4, in an exemplary embodiment, a generally planar gate valve 26 may be positioned inside the exhaust housing 32. In one embodiment, the planar gate valve 26 may be generally circular or otherwise match an interior configuration of the exhaust housing 32. The valve 26 may be coupled to the exhaust conduit 32 by a hinge 30 that is actuated by an electric motor 28 controlled by a computer. The circular valve may be fully closed, i.e. perpendicular to flow, or it can be fully open, i.e. parallel to flow, or partially open/close in an intermediate position between parallel and perpendicular. In an exemplary alternate embodiment, the wastegate may be configured from a computer-controlled diaphragm, such as operated by a spring.

Figure 5:
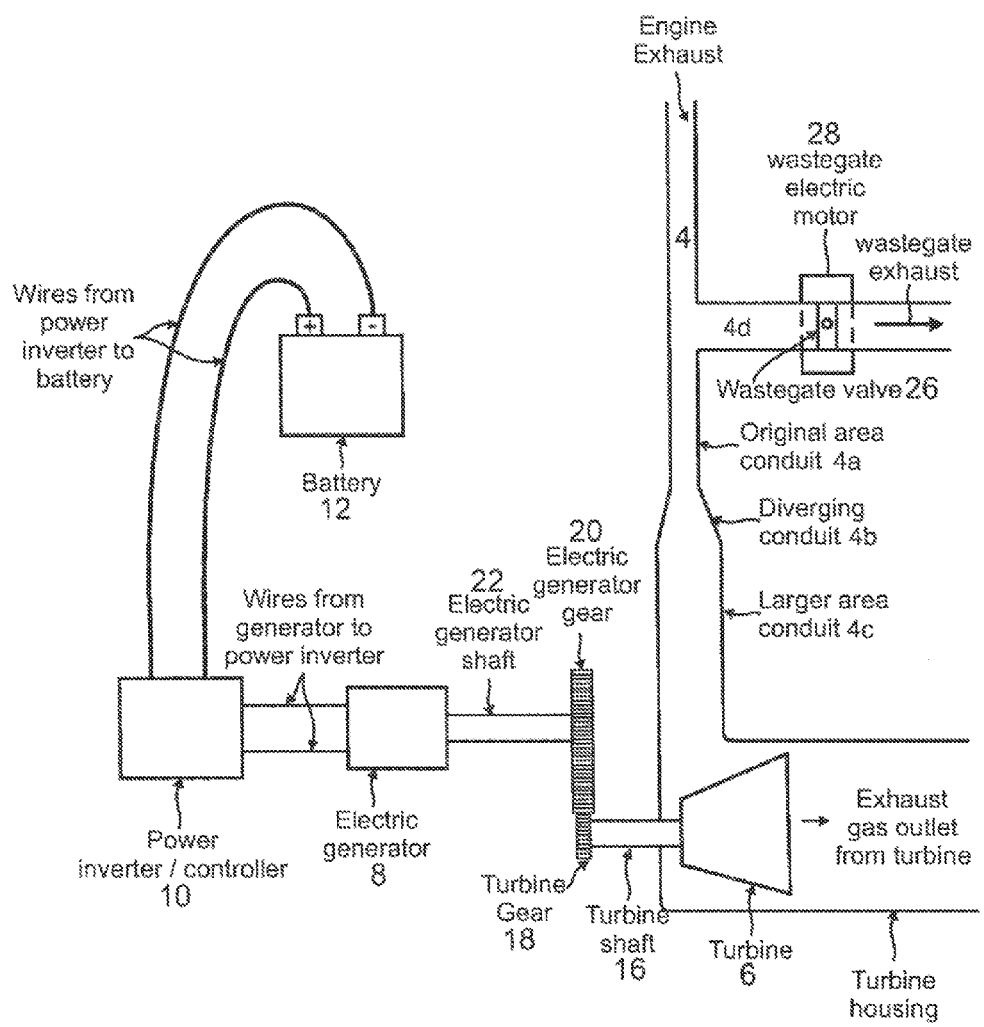
FIG. 5 illustrates an exemplary embodiment incorporating an alternate exhaust conduit configured to improve the application of the turbo recharger.
Figure 6:
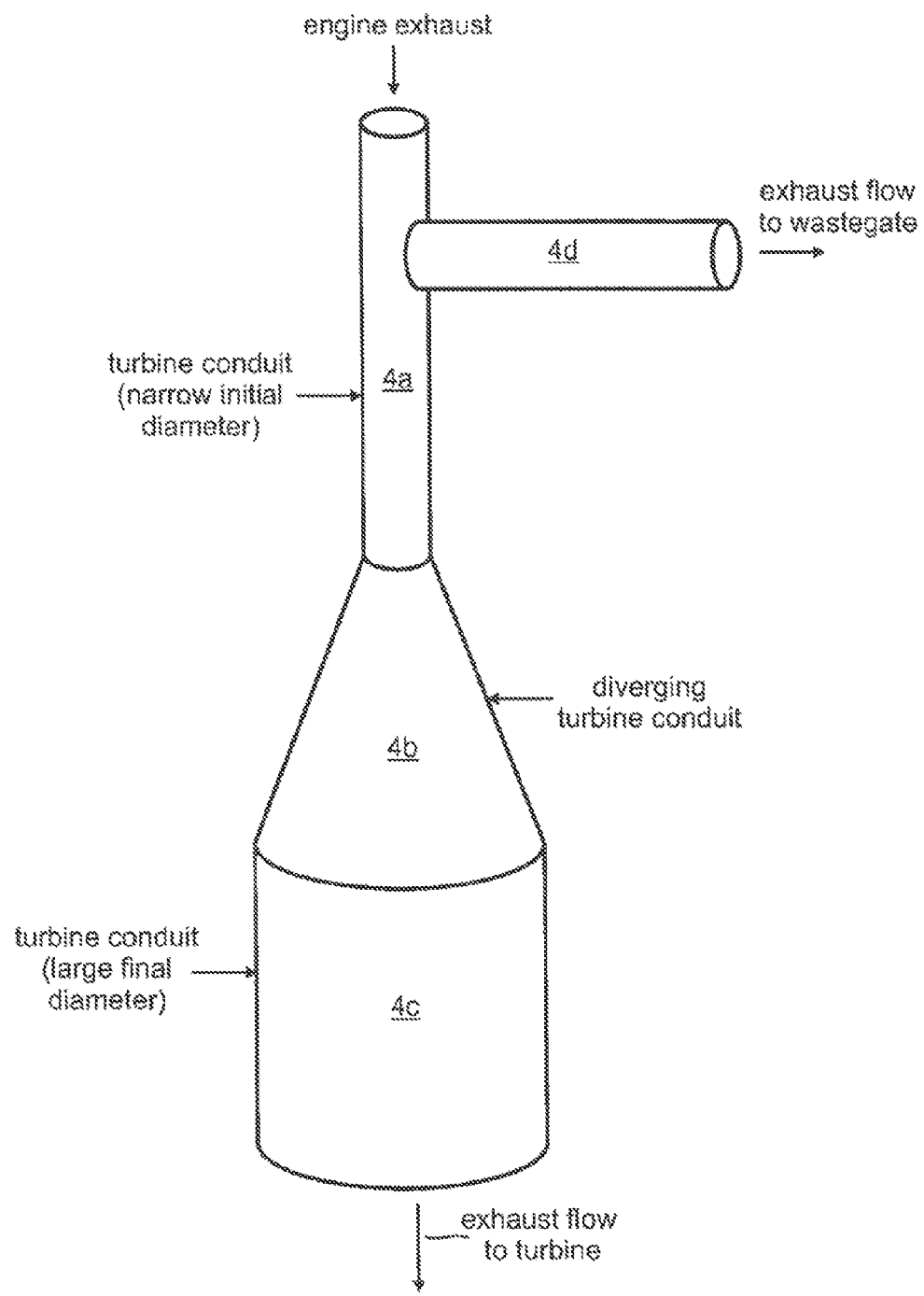
FIG. 6 illustrates the exemplary exhaust conduit of FIG. 5 in greater detail.

FIG. 5 illustrates an exemplary embodiment incorporating an alternate exhaust conduit configured to improve the application of the turbo recharger. FIG. 6 illustrates the exemplary exhaust conduit of FIG. 5 in greater detail. In an exemplary embodiment, the exhaust conduit may be configured to provide a desired or improved exhaust pressure to the turbine. For example, a divergent exhaust conduit may be incorporated in front and/or in line with the turbine 6. This configuration allows the fluid from the exhaust flow to expand, reducing its pressure before entering the turbine. Lower pressure at the turbine inlet allows the turbine to spin or turn more slowly. The increased volume of the conduit also permits a larger turbine to fit within the exhaust conduit. Effectively, the system allows the fluid to act over a larger area to turn a larger turbine at a lower pressure.

As shown in FIGS. 5 and 6, the exhaust conduit 4 out of the combustion engine may comprise multiple portions. A first portion 4a may be an extension of the exhaust conduit at approximately the same size and configuration. The first portion 4a directs the exhaust from the combustion engine exhaust 4 toward the turbine 6. A second portion 4b, has a gradually increasing diameter and throat area and transitions the exhaust conduit from the first portion to a third portion 4c. The third portion 4c has a larger diameter and corresponding larger area than the first portion 4a.

The dimensions of the third portion are selected in conjunction with the turbine and electric generator. The considerations include (1) increasing the size of the turbine to increase surface area and improve efficiency of capturing waste energy from the exhaust; (2) matching or reducing the turbine spin rate to the electric generator spin capabilities either through the direct shaft or appropriate reduction gear set. The second portion 4b couples the first and third portions together and transitions the conduit from the dimensions of the first portion to that of the second portion. As shown, in an exemplary embodiment, the second portion 4b may generally reverse taper from the smaller diameter of the first portion to the larger diameter of the third portion. The exhaust conduit may also comprise a fourth portion 4d to divert the exhaust from the combustion engine away from the turbine 6 and through the wastegate 24. The fourth portion 4d may be at the same, smaller, or larger dimension than the first portion 4a and/or exhaust 4 from the combustion engine.

The diverging exhaust conduit would present a significant problem for a conventional turbocharger focused on performance as it would increase lag and response time. However, the turbo recharger according to embodiments described herein improve efficiency and does not need nearly instantaneous reaction times to increase performance. If a longer amount of time passes because a larger, heavier turbine needs to spool up under lower pressure, the impact on efficiency should be minimal. The diverging exhaust conduit provides lower pressure, which results in the turbine spinning more slowly and the danger of the turbine turning the electric generator too quickly is reduced or eliminated. This should increase the life of both the turbine and the electric generator. The diverging conduit can be used alone with a single direct drive shaft or in conjunction with reduction gearing depending on how slowly the electric generator is configured to spin. The ideal combination of how much to increase the conduit area versus the exact ratio of the reduction gear is a problem that can be optimized for the specific vehicle, space requirements, electric generator, turbine, etc.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. The description includes references to first, second, or more objects or components. The numeric identifies are exemplary identifiers only indicating that a first may be distinct from a second or another component, and are not intended to require a specific number of separation of features or components.

I claim:

1. An electric hybrid vehicle, comprising:
   a first electric motor coupled to a battery;
   a combustion engine having an exhaust conduit;
   a turbine at least partially positioned within the exhaust conduit, the turbine coupled to a generator configured to supply a charge to the battery or current to the electric motor; and
   a wastegate configured to permit a fluid stream from the exhaust conduit to bypass the turbine when open and spin the turbine when closed, and configured to open when the battery is fully charged.

2. The electric hybrid vehicle of claim 1, wherein the wastegate is configured to open at low pressures and permit free flow of an exhaust stream from the combustion engine while the electric hybrid vehicle is accelerating to reduce restricting an exhaust.

3. The electric hybrid vehicle of claim 1, wherein the wastegate is configured to open at high pressure to relieve excess pressure.

4. The electric hybrid vehicle of claim 1, wherein the wastegate is computer-operated to determine an amount of opening of the wastegate.

5. The electric hybrid vehicle of claim 1, further comprising a pressure sensor to obtain a pressure within the exhaust conduit prior to the turbine, a speed sensor to obtain a rate of rotation of the turbine, a power sensor to obtain a charge of the battery, wherein a computer is configured to open the wastegate based on information obtained from the pressure sensor, the speed sensor, and the power sensor.

6. The electric hybrid vehicle of claim 1, further comprising a second electric motor coupled to the wastegate to actuate the wastegate.

7. The electric hybrid vehicle of claim 1, further comprising a gear set between the turbine and the first electric motor such that the turbine spins faster than the first electric motor.

8. The electric hybrid vehicle of claim 1, wherein the turbine and the first electric motor are directly connected such that the turbine and the first electric motor spin at comparable speeds.

9. The electric hybrid vehicle of claim 1, wherein the generator supplies a charge to the battery through a power inverted and controller.

10. The electric hybrid vehicle of claim 1, wherein the generator sends a charge to a power inverter and controller, which will then send a current to turn the electric motor.

11. The electric hybrid vehicle of claim 1, wherein the exhaust conduit branches into a first section in which the turbine is positioned, and a second portion in which the wastegate is positioned, wherein the second portion provides a bypass path around the turbine.

12. The electric hybrid vehicle of claim 11, wherein the wastegate is in the second portion of the exhaust conduit and comprises a gate valve having an outer perimeter corresponding with an interior perimeter of the second portion of the exhaust conduit.

13. The electric hybrid vehicle of claim 12, wherein the gate valve is hinged to the exhaust conduit such that rotation of the gate valve opens and closes the wastegate.

14. The electric hybrid vehicle of claim 13, wherein the gate valve is coupled to the second electric motor wherein the second electric motor is controlled by a computer.

15. The electric hybrid vehicle of claim 1, wherein the exhaust conduit comprises a first portion of reduced dimension directly adjacent the combustion engine and a second portion of increased dimension directly upstream of the turbine to reduce a pressure of the exhaust gases at a turbine inlet compared to a combustion engine outlet.

16. The electric hybrid vehicle of claim 15, wherein the exhaust conduit comprises a bypass portion from the first portion that provides an alternate exit path for exhaust fluids from the combustion engine without engaging the turbine.

17. The electric hybrid vehicle of claim 16, wherein the bypass portion comprises a wastegate to selectively open and close the bypass portion to exhaust fluids.

18. A turbo recharger system, comprising:
an electric motor coupled to a battery of a vehicle;
a turbine configured to be at least partially positioned within an exhaust conduit of a combustion engine, the turbine coupled to a generator configured to supply a charge to the battery or current to the electric motor; and
a wastegate configured to permit a fluid stream from the exhaust conduit to bypass the turbine in a first position and spin the turbine in a second position, and configured to be positioned in the first position when the battery is fully charged.

19. A method of increasing the efficiency of a hybrid vehicle comprising:
positioning a turbine at least partially within an exhaust conduit of the vehicle engine;
coupling the turbine to a generator configured to supply charge to a battery or an electric motor of the vehicle;
positioning a wastegate within a conduit which bypasses the turbine;
configuring the wastegate to permit the exhaust fluid stream to bypass the turbine when open and spin the turbine when closed; and
configuring the wastegate to open when the battery is fully charged.

* * * * *